D. REISER.
MACHINE FOR STITCHING PAMPHLETS.
APPLICATION FILED SEPT. 21, 1911.

1,086,085.

Patented Feb. 3, 1914.

WITNESSES:
Brennan B. West
Alice B. Moore

INVENTOR,
Daniel Reiser
BY Hull & Smith
ATTYS.

D. REISER.
MACHINE FOR STITCHING PAMPHLETS.
APPLICATION FILED SEPT. 21, 1911.

1,086,085.

Patented Feb. 3, 1914.

WITNESSES:
Brennan B. West
Alice B. Moore

INVENTOR,
Daniel Reiser
BY Hull & Smith
ATTYS.

D. REISER.
MACHINE FOR STITCHING PAMPHLETS.
APPLICATION FILED SEPT. 21, 1911.

1,086,085.

Patented Feb. 3, 1914.

WITNESSES:
Brennan Birket
Alice B. Moore

INVENTOR,
Daniel Reiser
By Hull & Smith
ATTYS.

D. REISER.
MACHINE FOR STITCHING PAMPHLETS.
APPLICATION FILED SEPT. 21, 1911.

1,086,085.

Patented Feb. 3, 1914.
5 SHEETS—SHEET 5.

WITNESSES:
Brennan B. West
Alice B. Moore

INVENTOR,
Daniel Reiser
BY Hull & Smith
ATTYS.

UNITED STATES PATENT OFFICE.

DANIEL REISER, OF CLEVELAND, OHIO, ASSIGNOR TO J. B. SAVAGE, OF CLEVELAND, OHIO.

MACHINE FOR STITCHING PAMPHLETS.

1,086,085.          Specification of Letters Patent.      Patented Feb. 3, 1914.

Application filed September 21, 1911. Serial No. 650,642.

*To all whom it may concern:*

Be it known that I, DANIEL REISER, a citizen of the United States, residing at Cleveland, in the county of Cuyahoga and State of Ohio, have invented a certain new and useful Improvement in Machines for Stitching Pamphlets, of which the following is a full, clear, and exact description, reference being had to the accompanying drawings.

This invention relates to a machine for book-binders' use which is adapted for the assembling, stitching, folding, and stacking of pamphlets, catalogues, signatures, and the like, and has for its object the provision of a machine wherein all the operations may take place automatically, the sole office of the operator or attendant being to feed the assembled pamphlets to one end of the machine and take away the finished and stacked booklets from the other. Comprised in this machine are mechanism for alining and truing up the leaves, for starting the stitching operation at the proper time upon each pamphlet, for holding each pamphlet securely in position during the application of the stitches thereto, for staggering the stitches in successive pamphlets in order that the stitches may offer less obstruction to the piling thereof, for folding the books when stitched, and for delivering said pamphlets in a regular and compact series; and new and improved expedients for performing these several operations are combined together in the machine disclosed herein.

More limitedly, the present application discloses and claims certain improvements over the device disclosed and claimed in my prior application, filed December 10, 1908, Ser. No. 466,756.

Generally speaking, my invention may be defined as consisting of the combinations of elements recited in the claims annexed hereto and illustrated in the drawings accompanying and forming a part hereof, wherein:

Fig. 11½ is a view taken on the same section line as Fig. 11 and illustrating certain features omitted from that figure.

Describing the parts by reference characters, 1 indicates the upright standard of a stitching or stapling machine of the usual, or any suitable type, such standard here shown carrying at its upper end a horizontal forwardly extending arm 2 having at its forward end the mechanism for securing wire staples in paper sheets. Supported upon a bracket 3 at the forward end of this arm is a wire reel 4 and journaled at the side of the stitching head is an oscillating lever 5 through which the end of the wire is passed. The forward side of the standard 1 is provided with a bracket 6 supporting the clencher 7 upon which the work is carried. Supported in the arm 2 is a suitable shaft adapted, at each rotation, to affix a single stitch or staple in the work presented to the stitching mechanism.

Figures 3, 4, 5, 6, 7, 8, 9:
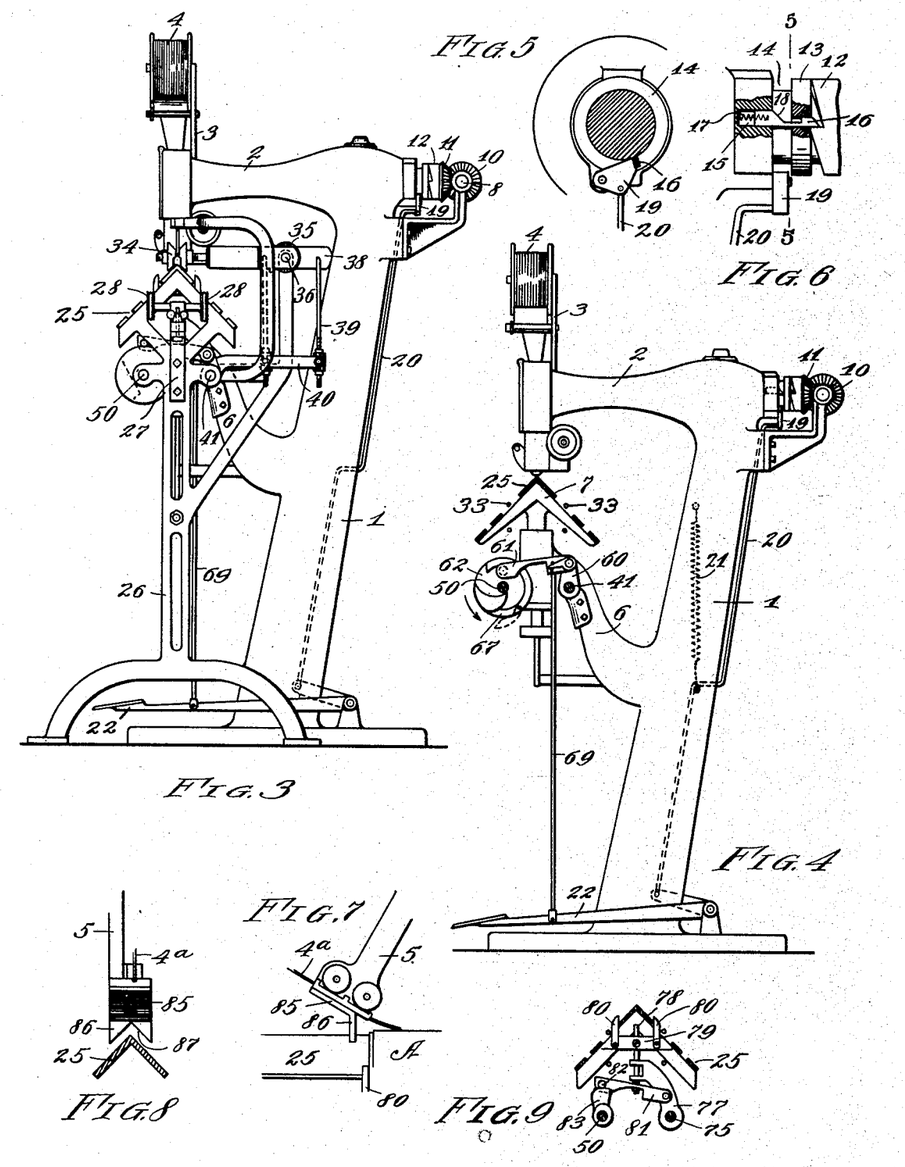
Fig. 3 is an elevation of the right-hand end of the machine.
Fig. 4 a transverse cross sectional view taken on the line 4—4 of Figs. 1 and 2.
Fig. 5 is a cross sectional view through the clutch employed in connection with the stitcher and taken on the line 5—5 of Fig. 6.
Fig. 6 is a detail elevational view of a portion of the clutch shown in Fig. 5, certain portions thereof being broken away.
Fig. 7 is a detail view of a portion of the swinging arm forming a portion of the stitcher and illustrating the header and clamper attached thereto.
Fig. 8 is a view of the parts shown in Fig. 7 looked at from the left-hand side of and showing the shape of the header and clamper.
Fig. 9 is a cross sectional view taken on the line 9—9 of Fig. 1 and showing the mechanism for arresting the progress of the pamphlet past the stitcher and determining the position where the stitches or staples shall be inserted.

The machine is operated through a constantly rotating shaft 8 having at one end the pulley or like-driving device 9 and having at its other end a suitable gear wheel 10 meshing with a pinion 11 sleeved on the end of the stitcher shaft above mentioned. The operation of the stitcher is governed by means of a peculiar clutch illustrated in Figs. 3 to 6 inclusive, said clutch comprising a crown-ratchet 12 formed integral with the pinion 11 and a spool 13 rigid with the stitcher shaft. Formed about the spool 13 is an annular groove 14 and crossing this groove is a longitudinal slot 15 in which is mounted the spring pressed plunger 16. A spring 17 tends to throw this plunger forwardly and to cause the end thereof to engage one of the teeth of the ratchet, as shown in Fig. 6. The side of the plunger is formed with an inclined portion 18 adapted to register with the groove 14 when the plunger is in protruded position, as shown in Fig. 6. Pivoted to the stitcher frame adjacent to the spool 13 is a trigger 19 to which is connected a rod 20. A spring 21 normally holds the trigger 19 in the groove 14, but a treadle 22 is provided whereby the rod 20 can be operated to move the trigger out of said groove. When the trigger is withdrawn from the groove the spring 17 serves to drive the plunger 16 forwardly into engagement with one of the teeth of the ratchet 12 and motion is thereby transmitted to the stitcher shaft. If the trigger be allowed to return to its position within the groove 14 in advance of the completion of a single revolution of this shaft, the engagement thereof with the inclined portion 18 of the plunger will withdraw the latter out of contact with the ratchet and the motion of the shaft will be arrested. Conversely, if the trigger be held out of contact with this plunger, the operation of the stitcher will continue without interruption. These parts are not of my invention, but a description thereof is deemed necessary to a complete understanding of my invention. It will be understood, however, that any form of clutch which will permit the sure operation of the stitcher and which will infallibly stop the same at a given phase of its rotation, can be employed.

Figure 1:
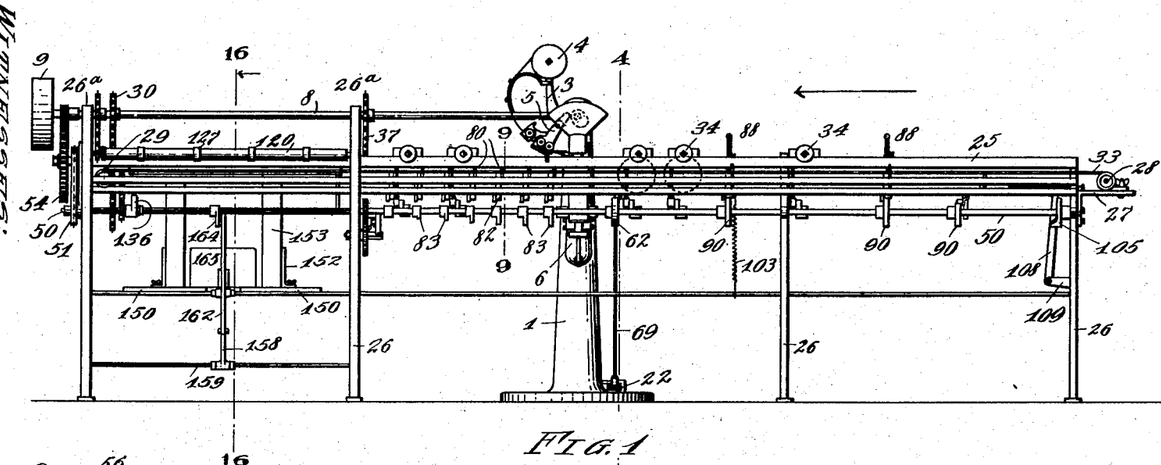
Figure 1 represents a front elevation of a complete machine built in accordance with my invention.
Figure 2:
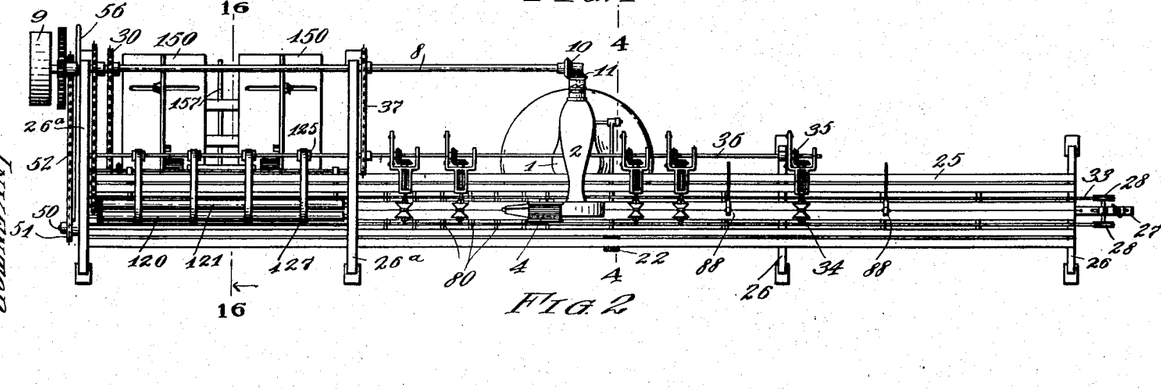
Fig. 2 a top plan view of the same.
Figure 10:
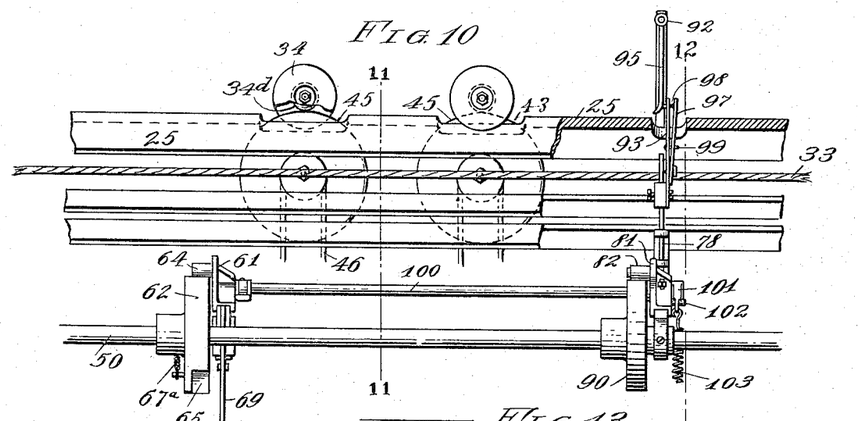
Fig. 10 is a front view of a portion of the machine shown in Fig. 1 illustrating the stitch governing and stop releasing devices.
Figures 11, 12, 13, 14:
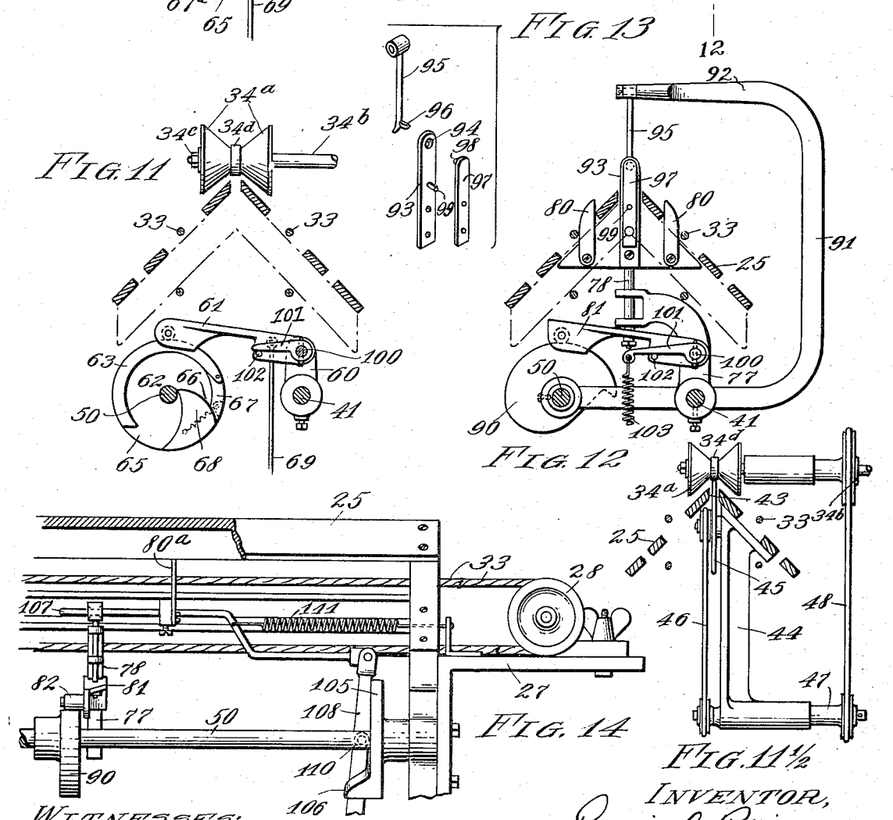
Fig. 11 is a cross sectional view taken on the line 11—11 of Fig. 10 and illustrating in detail the cam-member for governing the operation of the stitcher.
Fig. 12 is a cross sectional view upon the line 12—12 of Fig. 10 and illustrating in detail the mechanism for rendering the action of the machine automatic.
Fig. 13 is a view showing the elements of the latching mechanism in detached relation.
Fig. 14 is a side elevational view of a portion of the right-hand end of the machine illustrated in Fig. 1 and illustrating in detail the construction of the footing-up mechanism.
Figure 17:
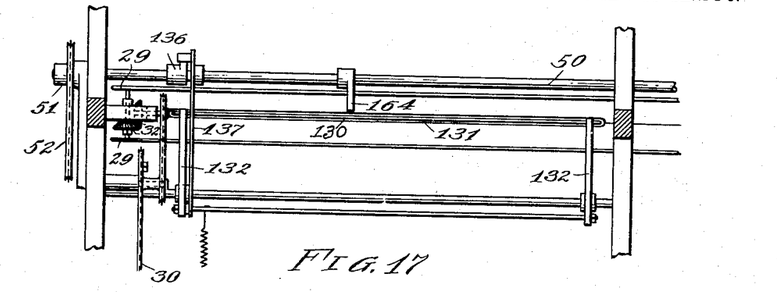
Fig. 17 is a bottom plan view of a portion of the ejecting mechanism.
Figures 18, 19, 20:
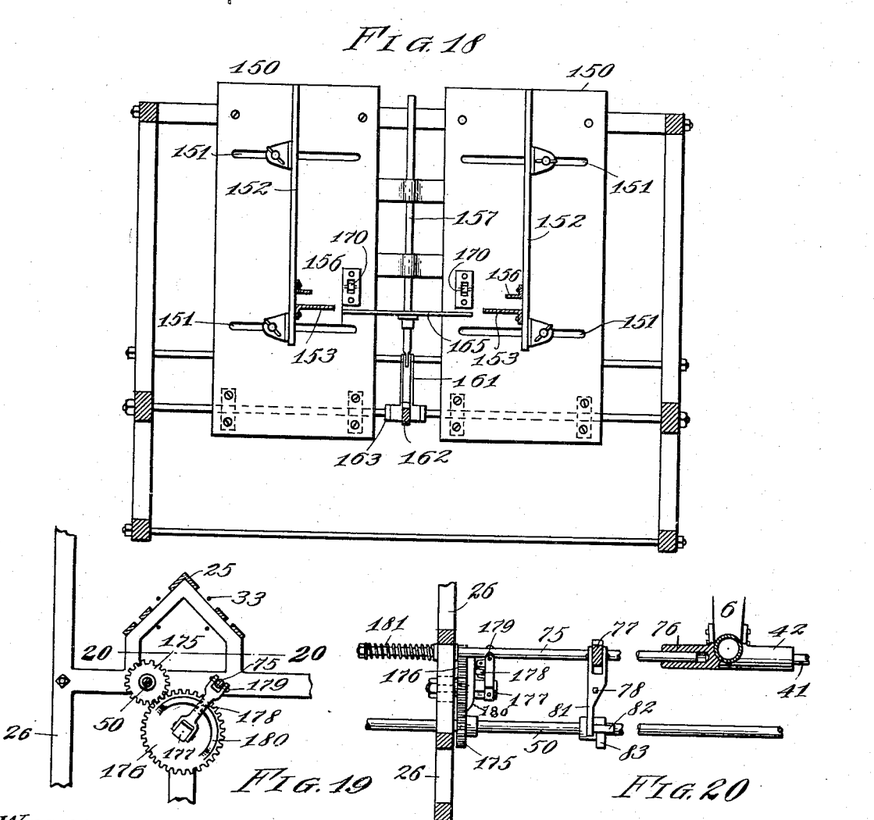
Fig. 18 is a plan view of a portion of the stacking mechanism.
Figs. 19 and 20 are detail views illustrating the mechanism for staggering the stitches applied to successive pamphlets.

Referring to Figs. 1 and 2 it will be seen that I have provided a horizontal feed-saddle 25 supported on suitable standards 26 and passing through the stitcher from right to left thereof. This saddle is substantially the shape of an inverted V, as will appear from Figs. 3, 4, 11, and 12, and forms a support for the books or pamphlets while the same are being carried to the stitcher, and from the stitcher to the folding and ejecting mechanism, the apex of the saddle receiving the middle portion of the open book. Carried by a bracket 27 at one end of the saddle is a countershaft upon which are mounted a pair of grooved pulleys 28, 28, and mounted at the farther end of the saddle are similar pulleys 29 (shown in Figs. 15 and 17), the latter pulleys being positively driven from the shaft 8 by means of the chains 30, 31, and gear wheels 32. Continuous carrier-belts or tapes 33 are carried by these pulleys, the side of the saddle being suitably broken away to permit these tapes to run freely from end to end of the machine. The upper portion of each of said tapes projects upwardly above the surface of the saddle so that the pamphlets may come into frictional contact therewith. In order to render the movement of the pamphlets still more positive and to prevent them from becoming displaced out of line with the saddle, grooved rollers 34 are disposed at intervals along the saddle, said rollers being driven by suitable gearing 35 from a counter-shaft 36 operatively connected to the shaft 8, as by the chain 37. In the embodiment shown herein these rollers are mounted upon brackets 38 adjustably secured by means of bolts 39 to arms 40 secured to a fixed rod 41 carried by the standards 26 below the saddle 25, said arms and brackets being preferably adjustable along said rod to permit said rollers to be positioned at points where they will feed the work positively to the machine. These brackets could obviously be supported otherwise than upon this rod, but the rod forms a convenient support for many of the machine parts as will later appear. One end of this rod is conveniently supported in a sleeve 42 fastened to the stitcher standard 1, as shown in Fig. 20. Each of these rollers comprises a pair of oppositely disposed frusto-conical members 34$^a$ sleeved upon a rotatable shaft 34$^b$ and held thereon by a nut 34$^c$ (Fig. 11). A washer 34$^d$ preferably of rubber is interposed between the apices of the members. Beneath certain of said rollers the apex or ridge of the saddle is formed with a slot 43, as shown in Figs. 10, 11 and 11½, and mounted upon a bracket 44 carried beneath the saddle is a thin rotatable disk 45 connected by means of a band 46 with a countershaft 47 which is in turn driven by means of a band 48 carried by the shaft 34$^b$. The edge of this disk is preferably reduced in thickness and may be roughened. It projects slightly above the surface of the saddle so as to engage the leaves of the pamphlets passing along the saddle and the rubber washer of the roller 34 is spaced slightly above the upper edge thereof.

It will be understood from the foregoing that when open signatures or pamphlets which are to be sewed are hung upon the saddle at the right hand end thereof they will be carried forwardly past the stitcher by reason of the action of the conveyer tapes 33 and rollers 34.

The mechanism for regulating the operation of the stitcher and for determining the position of the stitches in the pamphlets will next be described.

Figure 15:
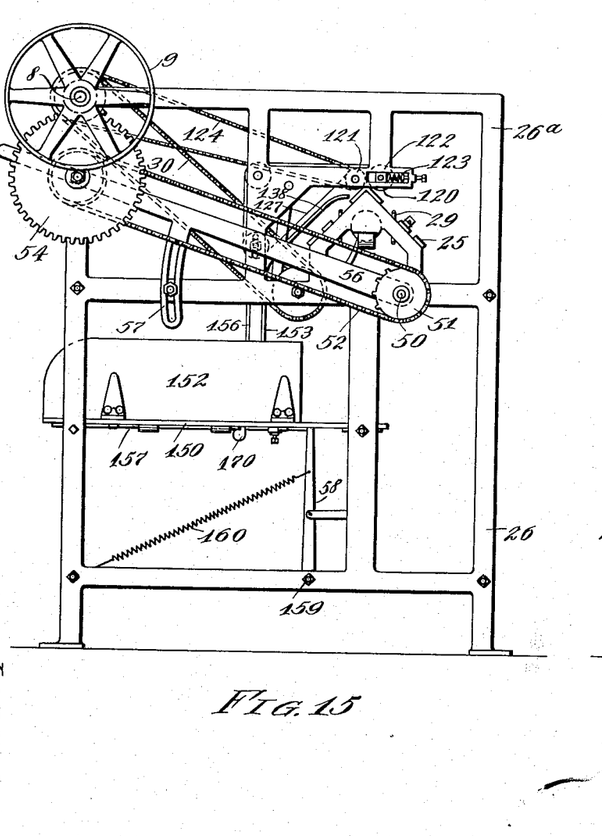
Fig. 15, an elevation of the left-hand end of the machine shown in Fig. 1.

Journaled in the standards 26 and running from end to end of the machine is a shaft 50 having at one end a sprocket wheel 51 driven by a chain 52 from a sprocket 53 carried by a gear wheel 54 which meshes with a pinion 55 carried by the main shaft 8. The sprocket 53 and gear 54 are journaled upon a stud carried by an arm 56, the inner end of which is journaled about the shaft 50, as shown in Fig. 15, so as to permit the use of gears 54 of different size, thereby varying the ratio of the speed of the shaft 50 to that of the shaft 8. The arm 56 is maintained in adjusted position by means of a segment 57, in a well-known manner. As before stated, the stitcher will operate as long as the trigger 19 is held out of engagement with the plunger 16, and it is necessary that this time be adjusted in accordance with the length of the books under operation and the number of stitches or staples to be applied thereto. Secured to the rod 41 is a bracket 60 to which is pivoted a forwardly extending lever 61 (Figs. 4 and 11). The forward end of this lever overhangs the shaft 50 which is here provided with a circular member 62 having at one side the semi-annular flange 63. The exterior of this member is circular, as shown in Fig. 11, and the lever 61 is provided with a roller 64 (Fig. 10) which runs on the exterior thereof. One portion of this flange is broken away to form an opening 65, and another portion is broken away to form an opening 66, the latter opening being closed by a hinged door 67, and the space between said openings being occupied by a cam-shaped projection 68. A spring 67ª is preferably connected to the door 67 so as to tend to hold the same in closed position, as shown in Fig. 11. The arm 61 is connected to the treadle 22 by means of a rod 69. If this treadle be depressed at the moment the opening 65 is passing by the roller 64, the arm 61 will be depressed so as to bring said roller inside of the flange 63, which then prevents its rising until the member 62 has rotated sufficiently far to permit the roller to pass out through the passage 66. The stitcher will therefore continue to operate during all this time, the number of stitches depending upon the relative rate of rotation of shafts 8 and 50, which is determined by the arrangement of the gears 54. Inasmuch as the pamphlet will be moving forwardly under the action of the conveyer tapes 33 and rollers 34 during the stitching operation, it is obvious that said stitches would be distributed along the back thereof without the employment of any particular additional mechanism, but for the purpose of inserting the stitches at uniform points I provide stops indicated generally by the reference character 70 and made as follows: Supported beneath the saddle 25 substantially in alinement with the rod 41 is a rod 75, (see Fig. 20) one end of said rod being supported in a sleeve 76 carried by the stitcher standard 1 and the other end being supported in one of the standards 26. Secured at intervals along this rod are brackets 77 having vertically slidable stems 78 mounted in their upper ends, as shown in Fig. 9. Each of these rods carries a cross piece 79 to the ends of which are secured upright fingers 80 adapted to pass upwardly through suitable apertures in the saddle and arrest the progress of the pamphlets therealong. Pivoted to each bracket 77 beneath the end of its stem 78 is a forwardly extending lever 81 having at its forward end a laterally extending roller 82 (Fig. 9) overhanging the shaft 50. Secured to the shaft 50 beneath each roller 82 is a cam finger 83, successive cam fingers being set at continually varying angles as regards said shaft. whereby said stop devices may be operated in succession. The distance between successive stops is made equal to the distance desired between successive stitches, and the stop nearest the stitches is made to operate in advance of the remaining stops. One of the rollers 34 and its accompanying disk 45 is preferably disposed adjacent to the stitcher and on the opposite side thereof from the stops 80. The peripheral speed of these disks and rollers is preferably slightly greater than that of said tapes and their action is to advance either the leaves or the cover, whichever may be laggard, into a position of evenness against the first stop prior to the application of the first stitch thereto. It is to be noted that the adjustment is such that the rollers 34 will press only very lightly upon the leaves beneath. The phase relation between the cam fingers 83 and the member 62 is also important. The depression of the treadle 22 and the trigger 19 can take place only when the member 62 has moved to such a point as to permit the roller 64 to drop into the passage 65, and the application of the stitch or staple takes place a definite time thereafter, depending upon the relation of the plunger 16 to the stitch-forming cam. At the placing of the first stitch it is necessary that the pamphlet be in engagement with the first of said stops, and the successive cam fingers are arranged in a manner to permit the advance of the pamphlet from one stop to the next in the interval between the application of successive stitches thereto. In the embodiment illustrated herein, seven stops are shown, which is a number sufficient for purposes of illustration. In case a smaller number of stitches be desired, any of the stops can be rendered inoperative by turning downward the fingers 80.

In order to assure the proper alinement of the several leaves of the pamphlet at the moment of stitching and to hold them tightly against the saddle during such operation, I preferably provide the expedient illustrated in Figs. 7 and 8. In the stitcher herein shown a swinging arm 5 is provided, through the end of which the wire 4ᵃ is threaded, said arm being swung forwardly and downwardly so as to advance said wire into the stitch-forming mechanism prior to the operation of the stitching device, and thereafter swinging backward along said wire so as to measure off a new length thereof in advance of the next operation. To the end of this arm I preferably secure a strip of stiff leather 85 having a downwardly bent portion 86 substantially vertical when the arm is at its lowest position, which forms a header. The latter portion of the strip is formed with a V-shaped notch 87, the sides of which are substantially parallel to the sides of the saddle 25 and arranged to come close thereto when the lever is depressed. In Fig. 7 a pamphlet A is illustrated in place upon the saddle, and the arm 5 is performing its downward movement. The forward movement of the pamphlet A has been arrested by the fingers 80 of the first stop, which are arranged so that the header 86 will gently tap the ends of the sheets just before reaching its final position, thereby driving the sheets of the pamphlet rearwardly along the saddle for a short distance and bringing them even with each other. At the next succeeding stitch the pamphlet will advance to the next stop and the header 86 will now straddle the back of the pamphlet at the conclusion of its downward swing, thereby clamping the same firmly to the saddle. I employ leather for this purpose because of its elasticity which permits the header to operate either against the ends or across the backs of the booklets.

Owing to the fact that the pamphlets are hindered in their motion during their passage past the stitcher, it is desirable that means be provided for holding back succeeding pamphlets until the machine is clear, otherwise the pamphlets are liable to pile up at the stitcher with consequent disarrangement of the leaves thereof. It is also desirable to adjust the positions of the pamphlets along the saddle so that they will arrive at the stitcher substantially at the time the stitcher begins to operate. For this purpose I provide preliminary stops, indicated generally by the reference character 88 and made as follows:—Secured to the rod 41 are brackets 77 which, in turn, carry stems 78 provided with stop fingers 80 operated by arms 81, exactly as in the device shown in Fig. 9. The cams are of different shape from the cams 83 and are shown at 90, being formed to hold the stops in obstructing position a greater proportion of the time. It is desirable, however, that the pamphlets be allowed to pass to the stitcher only when the member 62 stands in a predetermined phase of its revolution, since, if the pamphlet precedes this instant it will be obliged to wait at the stitcher until the operation thereof, or may even pass entirely by if the first stop be not in proper position. Likewise, if the pamphlet be delayed, it may be that the stitcher will operate before the arrival thereof, and, in any case, the position of the stitches will be irregular. Furthermore, if a pamphlet should pass over a stop while the same is depressed, and the stop be elevated before the pamphlet has cleared the same, the friction of the stop fingers would prevent the advance of the pamphlet until the next release of the stop whereupon the pamphlet would start too soon. In order to guard against all these contingencies it is necessary that the stops at the feeding side of the machine be released only in case a pamphlet is in position to pass by the same, and this result is obtained by means of the following mechanism: Carried by the rod 41 adjacent each of these stops is a bracket 91 having a forwardly extending arm 92 overhanging the saddle 25 immediately above the stem 78. Secured to the said stem is an upwardly projecting plate 93 having at its upper end a perforation 94, and pivoted to the arm 92 is a latch 95 having a prong 96 adapted to enter the perforation 94. Secured to the plate 93 at the side toward which the pamphlets come is a loosely mounted triggerplate 97 having a boss or projection 98 adapted to press against the prong 96. Alinement of the plates 93 and 97 is maintained by means of the stud 99 carried by one of the plates and passing through a suitable perforation formed in the other. With this construction it will be seen that, if a pamphlet be brought up against the plate 97 by means of the conveyer tapes and rollers during the time that the arm 81 is being supported by the cam 90, the latch prong 96 will be disengaged and the stop fingers 80 will be free to fall as soon as said cam has reached the proper phase, but that if no pamphlet be there, the stop will be retained in place and will not be released until the next rotation of the cam. Likewise, if the pamphlet approach only after the nose of the cam has passed the roller, the latch will not be unlocked, since the weight of the whole stop upon the prong 96 will render the friction so great that the unlocking will be delayed until the arm 81 is again supported by the cam.

In order to render the operation of the machine automatic I connect the trigger device just described with the arm 61 in the following manner: The arms 61 and 81 are journaled upon rock shaft 100 which is pivoted in the brackets 60 and 77, as shown in Figs. 10, 11 and 12. Secured to this shaft at the side of each of these arms is a finger 101 and carried by each arm beneath its finger is a pin 102, one of said fingers being extended for the attachment of a spring 103 by means of which it may be drawn downwardly. It is desirable that the cam 90 be secured to the shaft 50 at such an angle as regards the member 62 that a pamphlet released by the stop will have just enough time to reach the stitcher before the latter begins to operate. This being the case, if the latch 95 be disengaged by a pamphlet, the arm 81 and stop fingers 80 will fall at the next succeeding revolution of the cam 90, thereby permitting the depression of the finger 101 by the force of the spring 103. This movement is transmitted to the shaft 100, the finger 101 and pin 102 to the arm 61, which is thereby depressed so as to bring its roller 64 within the flange 63, starting the operation of the stitcher, as above described. The wide expanse of the cam 90 causes the resetting of the stop fingers in advance of that of the arm 61, which action is permitted by the loose connection of the pins and fingers. Likewise, if the latch 95 be not disengaged by a pamphlet, it is impossible for the machine to operate, inasmuch as the arm 81 will prevent the rocking of the shaft 100. It will also be seen that this arrangement does not prevent the operation of the stitcher by means of the treadle 22 when it is desired to run a small number of pamphlets through the stitcher.

As illustrated in Figs. 1 and 2, I preferably employ a plurality of stop members and latches in advance of the stitcher in order to effectively prevent the piling up of the pamphlets. Said stops also have a second function in that they arrest suddenly the forward movement of the sheets, thereby tending to preserve their alinement and causing them to be delivered to the stitcher with their edges even. This function is further fulfilled by means of a footing-up mechanism which I have here illustrated as disposed adjacent to the feeding end of the saddle for the purpose of striking the rear ends of the leaves and driving the sheets forwardly in even relation, which mechanism is illustrated in Fig. 14. Secured to the shaft 50 is a cam 104 exactly like the cam shown in Fig. 12, and secured to the end of the shaft 50 is a crown-cam 105 having at its side an abrupt cam finger 106. Associated with the cam 104 is a bracket 77, arm 81, roller 82 and reciprocating stem 78 exactly as in the device shown in Fig. 12. The fingers are illustrated at 80ª but instead of securing them to the upper end of this stem they are secured to a horizontal rod 107 secured at one end to said stem and at the other end to a lever 108 pivoted in a bracket 109 and provided with a roller 110 adapted to coöperate with the crown cam 105. A spring 111 is provided for drawing this rod toward the end of the machine. The cams 104 and 105 are so adjusted relatively to the shaft 50 that the cam 104 first elevates the fingers 80ª into engaging position, after which the cam 105 gives to the arm 108 a sudden forward impulse or kick, which causes the fingers to engage the rear ends of the sheets and shake them into alinement. Furthermore, the distance between the footing-up mechanism and the first of the stops 88 is preferably made exactly equal to the length of a book, and the former mechanism is arranged to act just in advance of the release of said stop. Every book which passes through the machine is, therefore, infallibly subjected to the action of the footing-up mechanism. I have illustrated this footing-up mechanism at the extreme end of the saddle, since it can be very conveniently placed here and will serve its purpose in an excellent manner, but I prefer to place it in actual practice adjacent to the stitcher so that it will act to line up the leaves just prior to stitching.

Figure 16:
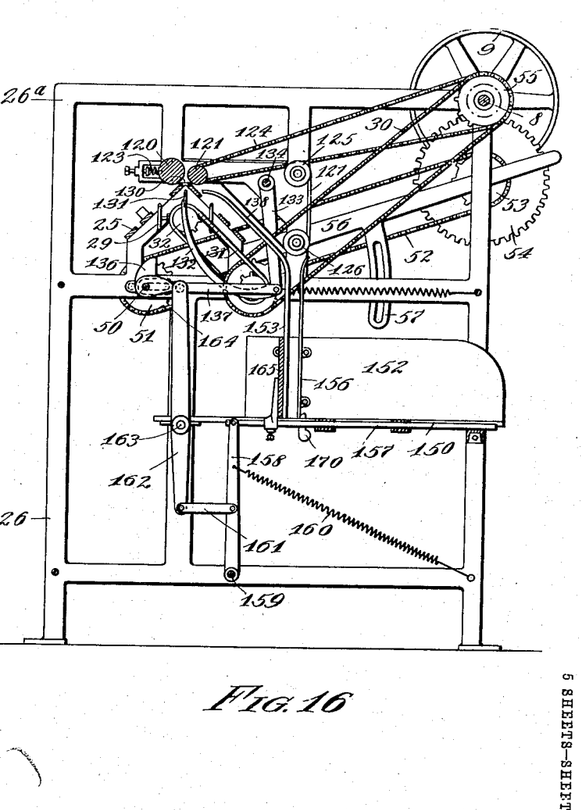
Fig. 16 is a cross sectional view taken on the line 16—16 of Figs. 1 and 2 looking in the direction of the arrows therein.

At the conclusion of the stitching operation, the booklets pass along the saddle to the left hand end thereof where they are removed by mechanism illustrated in Figs. 15 and 16. At this point the standards 26 are preferably extended above the saddle, as shown at 26ª, to form a frame, and journaled in this frame are a pair of parallel rollers 120 and 121 spaced from the apex of the saddle and parallel therewith. One of these rollers, as 120, is preferably mounted in slidable bearings, as shown at 122 and yieldingly pressed toward the opposite roller, as by means of a spring 123. The other roller is positively driven from the shaft 8 by means of a chain 124, or the like. Journaled in the frame parallel with the rollers 120 and 121 are other rollers 125 and 126, and around all of these rollers are stretched a plurality of endless bands or belts 127, each of these belts passing around rollers 120. 125, and 126 and over the roller 121, as shown in Fig. 16. Referring to Fig. 2 it will be seen that each of the rollers 125 and 126 is preferably formed as a separate pulley. It will also be seen from Figs. 15 and 16 that the portion of the belt 127 between the rollers 121 and 126 is substantially parallel with the adjacent side of the saddle 25, the roller 125 being so arranged as to cause the entire belts to run without interference. The apex of the saddle 25 is formed at this point with a longitudinal slot 130 and mounted beneath this slot is a long, narrow knife 131 carried by the upwardly extending arms 132, said arms being integral with the lower end of the swinging levers 133 pivoted at 134 to the frame. Secured to the shaft 50 is a cam finger 136 and connecting this cam finger with the arm 133 is a link 137. At each revolution of the shaft 50, said arm will be swung forwardly so as to thrust the knife 131 through the slot 130 and thereby thrust the back of a booklet which may be thereabove into the angle between the belts 127 and roller 121. The direction of rotation of the various rollers and of the belt is such as to draw the booklet upwardly and around the roller 121 and into a downwardly sloping channel defined by the guides or plates hereinafter described, and their action is of the greatest importance since they serve to express all air from between the leaves and permit the books to be packed in a minimum of space. Carried by the standards 26 below the end of this channel is a horizontal platform consisting of a pair of flat members 150, 150 spaced apart as shown in Figs. 2 and 18. Each of these members is formed with a pair of transverse slots 151 and mounted in an upright position upon each of these members is a side board or guide 152 secured in place by means of thumb screws engaged in said slots. Secured to the inner faces of the side boards 152 are vertical guide members 153, having their upper end bent substantially parallel with the belts 127 as shown at 138, this portion being interposed between said belts and the saddle 25 and adapted to receive the booklets from the roller 121, as above described. Carried by the inner faces of the side boards a short distance forward of the guide member 153 are more shallow guides 156, the upper ends whereof are extended to a point adjacent to the roller 126, as shown in Fig. 16. Mounted between the members 150 is a reciprocable rod 157, the rear end whereof is articulated to a lever 158 pivoted at 159 and yieldingly held in rearward position by means of a spring 160. A link 161 connects this lever with the end of a second lever 162 pivoted at 163 and having its upper end adjacent to the shaft 50. A cam finger 164 carried by this shaft serves to oscillate said lever once at every revolution. Secured to the rod 157 is an upright plate 165, the width whereof is less than the distance between the guide members 153.

In setting up the machine, the distance between the side boards 152 is made slightly greater than the length of the pamphlets to be sewed, the distance between the guides 156 being slightly less than the length of such pamphlets. The adjustment of the cam fingers 136 and 154 is such that the plate 165 will be held in retracted position, as illustrated in Figs. 16 and 18, at the instant each booklet is ejected from the saddle and allowed to fall to the receiving platform. Immediately thereafter the plate 165 is allowed to be thrust forwardly by the spring 160, whereupon said pamphlet is flicked past the guides 156 and pressed against the rear of the pile already delivered. The guide 156 will prevent said pamphlets from falling back into the path of the succeeding booklets. Pawls 170 are also carried by the flat members 150 and still further prevent the return of the books ejected.

It will be apparent from the foregoing that the whole operation of the machine is regulated and controlled by the shaft 50, and that, owing to the formation of the member 62, this shaft makes one complete rotation for each pamphlet sewed. It will, therefore, be apparent that each pamphlet delivered to the feeding end of the machine will receive one kick from the footing up mechanism, will be delayed once at each of the latched stops, will be retarded by each of the stops at the right of the stitcher for the purpose of allowing a stitch or staple to be placed, will be ejected from the saddle by the knife 131 at a predetermined time thereafter, and will be stacked on the receiving platform by a cam also driven by the same shaft. The number of stitches which will be applied to each booklet depends upon the ratio of the rotation of shafts 8 and 50. Thus, if the ratio of speed of the shaft 8 to the shaft 50 be high the number of staples inserted will be greater than if such ratio be low, since a greater number of actuations of the stitcher will take place while the member 62 is being rotated a sufficient distance to permit the release of the lever 61. The distance between successive staples will depend upon the adjustment of the stops 80 and cams 82, and the number of these stops will depend upon the number of stitches being inserted.

Reference has already been made to the desirability of staggering the stitches applied to successive booklets in order that the wire staples may interfere less with their being stacked. This result is attained by means of the mechanism illustrated in Figs. 19 and 20. Secured to the shaft 50 is a pinion 175 and journaled on a stud carried by the standard 26 is a gear wheel 176, here shown as having twice the diameter of the pinion 175. The outer end of this stud is squared, as shown at 177, and a lever arm 178 is pivoted thereto, the outer end of said lever arm being pivoted at 179 to the rod 75. Carried by the face of the gear 176 is a semi-annular cam flange 180 adapted to engage a suitable roller carried by the lever arm 178. The inner end of the rod 75 is slidably mounted in the sleeve 76, and the outer end thereof is provided with a spring 181, as shown in Fig. 20. The stops 80 are carried by the rod 75, as above described. With this construction it will be seen that the rod 75 will be shifted nearer or farther from the stitcher at alternate revolutions of the shaft 50, thereby causing the staples to be applied at different positions of the booklet, the rollers 82 being elongated sufficiently to engage their cams in both positions. In case it were desired to scatter the stitches still more widely, it is obvious that a higher ratio could be employed for the gears 175 and 176, and the cam flange 180 made with a correspondingly larger number of steps.

It is obvious that, when the staggering mechanism be in operation, it is impossible for the header carried by the arm 5 to operate upon the end of every booklet, but only upon the ends of alternate booklets. For this reason it is proposed to employ the staggering mechanism only in connection with pamphlets of small thickness wherein the obstructive effect of the staples is particularly apparent and in which the necessity for employing the header is correspondingly small. In case of pamphlets of this size it is immaterial whether the header acts by abutting against the ends of the leaves or by straddling the back thereof. In case of books of greater thickness, the staggering mechanism may be thrown out of gear by shifting the pinion 175 along the shaft 50, since the obstructing effect of the staples is very small in a book of this thickness and since the necessity for the use of the header is much greater.

It will be understood that the particular form of stitcher employed is not material to the performance of my invention, and that any machine for fastening together sheets of paper is contemplated, except as specifically restricted by the terms of certain of the claims. Thus the employment of a machine for riveting, buttoning or crimping the sheets together, or of sewing them with thread instead of stapling them with wire is considered to lie within the scope of my invention. Therefore, where I have employed the expression "stitcher" or "stitching mechanism" in the claims, I wish to be understood as reciting the same generically.

While I have described my improved mechanism in the manner which commends itself to me as the most desirable, it is to be understood that a great number of changes in all the details thereof can be made without altering the operation or departing from the scope of my invention. It is therefore to be understood that I do not propose to limit myself to the details of construction herein described except as the same may be specifically described in the claims hereto annexed or may be rendered necessary by the prior state of the art.

Having thus described my invention, what I claim is:—

1. In a conveying mechanism, the combination, with a support for articles to be conveyed, of frictional means for transporting articles along said support, stop members arranged to be interposed into the path of said articles, and means for preventing the withdrawal of said stop members from obstructing position excepting upon the arrival of an article at said stop members prior to a predetermined time.

2. The combination, with supporting and conveying mechanisms, of spaced stop members arranged to be interposed in the path of articles on said conveying mechanism, a timing member adjacent to said mechanism, means carried by said timing mechanism for withdrawing said stop members from the path of said articles at predetermined times, locking devices for said stop members arranged to prevent the releasing movement thereof excepting upon the arrival of an article prior to such predetermined time, and means associated with said stop members and arranged to be operated by an article for disengaging said locking devices prior to such predetermined time.

3. In a conveying mechanism, the combination, with an endless belt conveyer of a rotatable shaft adjacent to said conveyer, a cam on said shaft, a stop member operatively connected to said cam and arranged to be interposed thereby into the path of articles on said conveyer, a latch arranged to act at certain times as a support for said stop member, a tripping device for said latch arranged to be operated by the pressure of an article when brought thereto by said conveyer, said tripping device being arranged to be rendered inoperative when contacted during the time that the said latch acts as a support for the said stop member.

4. In a device of the character described, in combination, a support, frictional means for conveying articles along said support, stop devices spaced at intervals along said support, means for moving said stop devices out of obstructing position at predetermined lengths of time, means for locking said stop devices against such movement excepting upon the arrival thereat of an article being transported prior to such releasing time, means arranged to be operated by said article for releasing said stop devices, and supplementary means for preventing the release of such stop devices after such predetermined time.

5. In a device of the character described, the combination, with a support for books to be sewed, of means for conveying said books along said support, stitching mechanism adjacent to said support, a stop arranged to be interposed into the path of said books in advance of said stitching mechanism, and means for preventing the withdrawal of said stop from obstructing position excepting upon the arrival of a book at said stop prior to a predetermined time.

6. In a device of the character described, the combination, with a stitching mechanism, of a support for books traversing said stitching mechanism, means for conveying books along said support, stop members arranged to be interposed in the path of said books in advance of their arrival at said stitching mechanism, timing mechanism associated with said stitching mechanism and connected therewith so as to move in a definite phase relation thereto, means carried by said timing mechanism for withdrawing said stop members from the path of said books at predetermined times, locking devices for said stop members and arranged to prevent the releasing movement thereof excepting upon the arrival of a book prior to such predetermined time, and means associated with said stop members and arranged to be operated by a book for disengaging said locking devices prior to such predetermined time.

7. In a device of the character described, the combination, with a stitcher, of a support for books traversing said stitcher, frictional conveying means associated with said support and adapted to convey said books therealong, a rotatable shaft adjacent to said support, a cam on said shaft, a stop member operatively connected to said cam and arranged to be interposed thereby into the path of said books, a latch arranged to act at certain times as a support for said stop member, a tripping device for said latch arranged to be operated by the pressure of a book thereagainst when conveyed thereto by said frictional conveying means, said tripping device being arranged to be rendered inoperative when contacted during the time that the said latch acts as a support for the said stop member.

8. In a device of the character described, the combination, with stitching mechanism, of a V-shaped saddle traversing said mechanism and having elongated apertures in the sides thereof, frictional conveying means adjacent to said saddle and adapted for conveying superposed sheets of paper therealong, brackets beneath said saddle and adjustable longitudinally thereof, vertically reciprocable stems carried by said brackets and having fingers at their upper ends arranged to project through said apertures, and means operative in fixed phase relation to said stitching mechanism for reciprocating said fingers through said apertures into and out of obstructing position with regard to said paper sheets.

9. In a device of the character described, the combination, with a stitcher, of a V-shaped saddle traversing the same and having elongated slots in its sides, frictional conveying means adjacent to said saddle and adapted for conveying superposed sheets of paper therealong, vertically reciprocable stems beneath said saddle, fingers carried by said stems and arranged to project upwardly through said slots when said stems are in elevated position, and means operating in fixed phase relation to said stitcher for reciprocating said fingers into and out of obstructing position, said stems being adjustable along said slots so as to stop said sheets at different points along said saddle.

10. In a device of the character described, the combination, with a stitching mechanism, of a V-shaped saddle traversing said mechanism and having apertures in the sides thereof, frictional conveying means adjacent to said saddle and adapted for conveying superposed sheets of paper therealong, brackets beneath said saddle, vertically reciprocable stems carried by said brackets and having fingers at their upper ends arranged to project through said apertures, a shaft mounted longitudinally of said saddle, cams on said shaft, connections whereby said cams will reciprocate said stems upon the rotation of said shaft, and means for operating said stitching mechanism in predetermined phase relation with said cams.

11. In a device of the character described, the combination, with stitching mechanism, of a saddle traversing said mechanism and having apertures in its side walls, reciprocable stems mounted beneath said saddle and having transverse headers at their upper ends, fingers carried by said headers and arranged to project through said apertures, frictional means for conveying superposed sheets of paper along said saddle, and means for reciprocating said stems in fixed phase relation to the operation of said stitching mechanism.

12. In a device of the character described, the combination, with stitching mechanism, of a support traversing said mechanism and having apertures therethrough, reciprocable stems mounted beneath said support and having transverse headers at their upper ends, fingers carried by said headers and arranged to project through said apertures, frictional means for conveying superposed sheets of paper along said support and means for reciprocating said stems in fixed phase-relation to the operation of said stitching mechanism, and said fingers being reversible whereby the obstructing effect thereof may be prevented.

13. In a device of the character described, the combination, with a stitching mechanism, of a saddle traversing said mechanism and having elongated apertures in the sides thereof, frictional conveying means adjacent to said saddle and adapted for conveying superposed sheets of paper therealong, brackets beneath said saddle, vertically reciprocable stems carried by said brackets and having fingers at their upper ends arranged to project through said apertures, means operative in fixed phase relation to said stitching mechanism for reciprocating said fingers through said apertures into and out of obstructing position with regard to said paper sheets, and means for shifting all of said brackets along said saddle upon the passage of successive sheets through said stitching mechanism whereby the stitches inserted therein will be staggered.

14. In a device of the character described, the combination, with stitching mechanism, of a support traversing said mechanism and having frictional conveying means adapted for conveying superposed sheets of paper therealong, a continuously rotating shaft adjacent to said support, connections between said shaft and said stitching mechanism whereby each pile of sheets will be completely stitched during a single revolution of said shaft, a longitudinally shiftable rod parallel with said support, stop members carried by said rod and arranged to be moved into position to obstruct the passage of said sheets through said stitching mechanism, cams carried by said shaft for operating said stop members, means for shifting said rod axially of its length upon successive revolutions of said shaft, and means for varying the rate of revolution of said shaft to the rate of operation of said stitching mechanism.

15. In a device of the character described, the combination, with stitching mechanism, of a saddle traversing the same and having apertures in the side walls thereof, frictional conveying means for moving superposed paper sheets along said saddle, vertically reciprocable stems mounted beneath said saddle and having upwardly projecting fingers traversing said apertures, cams for alternately raising and lowering said stems and thereby moving said fingers alternately into obstructing and non-obstructing position, means for operating said stitching mechanism in fixed phase relation to said cams, latches for maintaining said fingers in upward position and devices for disengaging said latches when contacted by said paper sheets, said disengaging devices being operative only while said cams are in a phase to hold said fingers in elevated position.

16. In a device of the character described, the combination, with stitching mechanism, of a support traversing the same and having apertures therethrough, frictional conveying means for moving superposed paper sheets along said support, a frictionally reciprocable stem mounted beneath said support and having upwardly projecting fingers traversing said apertures, a cam for alternately raising and lowering said stem and thereby moving said fingers alternately into obstructing and non-obstructing position, means for operating said stitching mechanism in fixed phase relation to said cam, one of said fingers having a perforation, a bracket above said support, a swinging latch carried by said bracket and having a projection adapted to engage said perforation, and an unlocking plate carried by said finger and arranged to be engaged by the advancing ends of said paper sheets to disengage said latch.

17. In a device of the character described, the combination, with a stitcher having a swinging arm, of a support for books traversing said stitcher, means for conveying books along said support, and a header carried by said swinging arm and arranged to strike suddenly the ends of books conveyed along said support prior to the application of the first stitch thereto, whereby the leaves of said book may be shaken into alinement.

18. In a device, of the character described, the combination, with a stitcher having a swinging arm, of a saddle traversing said stitcher, means for conveying superposed sheets of paper along said saddle, and a header carried by said swinging arm and arranged to strike suddenly the ends of paper sheets conveyed along said saddle prior to the application of the first stitch thereto whereby the leaves of said book may be shaken into alinement, said header having a notched end corresponding in shape to said saddle.

19. In a device, of the character described, the combination, with a stitcher having a swinging arm, of a support for books traversing said stitcher, means for conveying books along said support, and a cushion of yielding material carried by said arm and arranged to engage the backs of books conveyed along said support, whereby they may be clamped securely against said support during the application of stitches thereto.

20. In a device, of the character described, the combination, with a stitcher having a swinging arm, of a saddle traversing said stitcher, means for conveying superposed sheets of paper along said saddle, and a bifurcated header of yielding material carried by said arm and arranged to engage the backs of books conveyed along said support whereby they may be clamped securely against said support during the application of stitches thereto, said header having a notched end corresponding in shape to said saddle.

21. In a device of the character described, the combination, with a stitcher having a downwardly swinging arm adjacent to the stitching head thereof, of a saddle shaped like an inverted V and traversing said stitcher, means for conveying superposed sheets of paper along said saddle toward the side of the stitcher head opposite to that upon which said arm is mounted, and a bifurcated flexible header secured to said arm and arranged to be brought adjacent to said saddle just prior to the application of each stitch whereby said paper sheets may be shaken into alinement and held firmly during the application of the stitches thereto.

22. In a device of the character described, the combination, with a stitcher having a downwardly swinging arm adjacent to the stitching head thereof, of a saddle traversing said stitcher, means for conveying superposed sheets of paper along said saddle toward the side of the stitcher head opposite to that upon which said arm is mounted, a bifurcated flexible header secured to said arm and arranged to be brought adjacent to said saddle just prior to the application of each stitch whereby said paper sheets may be shaken into alinement and held firmly during the application of the stitches thereto, and stop members associated with said saddle beyond said stitcher and arranged to be interposed successively into the path of movement of said paper sheets, the distance between successive stop members being equal to the distance between successive stitches, and the first of said stop members being slightly forward of the stitching position of said swinging arm.

23. The combination, with a stitcher, of a V-shaped saddle traversing said stitcher and adapted for the reception of superposed sheets of paper, each side of said saddle having a slot between the bottom and the apex thereof and running from end to end of the saddle, a counter-shaft journaled transversely of said saddle adjacent to each end thereof, a pair of grooved pulleys on each counter-shaft and having their upper edges intersecting said slots, and endless belts or tapes belted around said pulleys and adapted to drag said paper sheets along said saddle, means for rotating one of said counter-shafts at a fixed rate, and stop means below said saddle and arranged to be elevated through said slots closely adjacent to said belts or tapes to engage said paper sheets and hinder their passage along said saddle.

24. The combination, with a stitcher, of a V-shaped saddle traversing said stitcher and adapted for the reception of superposed sheets of paper, each side of said saddle having a slot between the bottom and the apex thereof, and said slots running from one end of said saddle to the other end, a counter-shaft journaled transversely of said saddle adjacent to each end thereof, a pair of grooved pulleys on each counter-shaft and having their upper edges intersecting said slots, endless belts or tapes belted around said pulleys and adapted to drag said paper sheets along said saddle, and means for rotating one of said counter-shafts at a fixed rate.

25. The combination, with a stitcher, of a V-shaped saddle traversing said stitcher, endless belts or tapes adjacent to each side of said saddle and adapted to convey paper sheets therealong, brackets carried by said saddle, V-shaped rollers journaled in said brackets transversely of said saddle, the inclined sides of said rollers being substantially parallel to the similarly inclined sides of said saddle, means for driving said tapes and said rollers at substantially equal peripheral speeds, and means for adjusting said rollers toward and from said saddle whereby their pressure upon said paper sheets may be varied.

26. In a device of the character described, the combination, with a stitcher, of a support adapted for the reception of superposed paper sheets, frictional conveying means for transporting said paper sheets to and past said stitcher, a stop member adjacent to the receiving end of said support, means for moving said stop member into the space above said support immediately in the rear of the paper sheets carried thereby, and means for imparting to said stop member a forward movement along said support in the direction of movement of said sheets, whereby the rear edges of said paper sheets may be forced into alinement.

27. In a device of the character described, the combination, with a stitcher, of a support adapted for the reception of superposed paper sheets and having elongated recesses adjacent to the receiving end thereof, frictional conveying means for transporting said paper sheets to and past said stitcher, a stop member adjacent to the receiving end of said support and having fingers, means for moving said stop member into the space above said support immediately in the rear of the paper sheets carried thereby so as to cause said fingers to project into said recesses, and means for imparting to said stop member a forward movement along said support whereby the rear edges of said paper sheets may be forced into alinement.

28. In a device of the character described, the combination, with a stitcher, of a V-shaped saddle traversing the same and having a slot in each of its side walls, frictional means for conveying paper sheets along said saddle, a stop beneath said saddle and having fingers arranged to be moved upwardly through said slots into a position to engage paper sheets lying on said saddle, means for intermittently elevating said fingers into obstructing position, and means operative subsequent to such elevation for moving said fingers forward along said slot to engage the rear edges of said paper sheets.

29. In a device of the character described, the combination, with a stitcher, of a support traversing said stitcher and adapted to receive superposed paper sheets, frictional means for conveying said sheets to said stitcher, a stop member arranged to be interposed in the path of motion of said paper sheets to arrest their progress along said support, a member in the rear of said stop member and arranged to be brought opposite the rear edges of said sheets, means for moving said last member toward said stop member so as to strike the rear edges of said sheets and shake them into alinement, and means for thereafter removing said stop member out of obstructing position.

30. In a device of the character described, the combination with a stitcher, of a V-shaped support traversing said stitcher and adapted to receive superposed paper sheets, said support having elongated apertures in its side walls, frictional means for conveying said sheets to said stitcher, a stop member beneath said support and having fingers arranged to be interposed in the path of motion of said paper sheets and to arrest their progress along said support, a member beneath said support in the rear of said stop member and having fingers arranged to be elevated opposite the rear edges of said sheets, means for moving said last member toward said stop member so as to strike the rear edges of said sheets and shake them into alinement, and means for thereafter removing said stop member out of obstructing position, said members being adjustable toward and from each other along said apertures whereby to accommodate sheets of different lengths.

31. In a device of the character described, the combination, with a stitching mechanism, of a support for books traversing said mechanism, frictional means for conveying books along said support, stop devices arranged to be interposed in the path of said books so as to retard the same while subjected a plurality of times to the operation of said stitcher, and means for adjusting said stitcher to operate upon each book a number of times equal to the number of said stop devices.

32. In a device of the character described, the combination, with stitching mechanism, of a support for books traversing said mechanism, means for conveying books along said support, means for automatically setting said stitcher into operation upon the arrival thereat of a book, means for preventing the operation of said stitcher except upon the arrival of a book thereat, and means for determining the number of times that said stitcher shall operate upon each book.

33. In a device of the character described, the combination, with stitching mechanism, of a support for books traversing said mechanism, frictional means for conveying books along said support, stop members arranged to be interposed into the path of motion of said books, the distance between adjacent stop members being equal to the distance desired between adjacent stitches, timing means for operating said stop members successively to subject each book a plurality of times to the operation of said stitching means, and connections between said stitching mechanism and said timing means whereby the number of stitches applied to each book may be determined.

34. In a device of the character described, the combination, with stitching mechanism, of a support for books traversing said mechanism, means for conveying books along said support, timing mechanism, connections between said timing mechanism and said book conveying means whereby a predetermined ratio is established between the rate of said timing mechanism and the rate of passage of said books past said stitching mechanism, and means for varying the rate of operation of said stitching mechanism with reference to said timing mechanism, whereby the number of stitches applied to each book may be determined.

35. In a device of the character described, the combination, with stitching mechanism, of a carrier for books traversing said stitching mechanism, frictional means for conveying books along said carrier, stops adapted to be interposed in the path of said books, the distance between said stops being equal to the distance desired between successive stitches, timing mechanism adapted to operate said stops successively, and means carried by said timing mechanism to prevent the operation of the stitching mechanism excepting in a predetermined phase with said timing mechanism.

36. In a device of the character described, the combination, with stitching mechanism, of a carrier for books traversing said stitching mechanism, frictional means for conveying books along said carrier, stops arranged to be interposed in the path of said books, the distance between said stops being equal to the distance desired between successive stitches, timing mechanism adapted to operate said stops successively, means carried by said timing mechanism to prevent the operation of the stitching mechanism excepting in a predetermined phase with said timing mechanism and means for determining the ratio of speed of said stitching mechanism with respect to said timing mechanism, whereby to determine the number of stitches to be taken in each book.

37. In a device of the character described, the combination, with stitching mechanism, of a carrier for books traversing said stitching mechanism, means for conveying books along said carrier, stop members arranged to be interposed in the path of motion of said books to hinder the approach thereof to said stitching mechanism, timing mechanism for withdrawing said stop members from hindering position, and means carried by said timing mechanism and arranged to start the operation of said stitching mechanism a predetermined time after the removal of said stop members.

38. In a device of the character described, the combination, with stitching mechanism, of a carrier for books traversing said stitching mechanism, means for conveying books along said carrier, stop members arranged to be interposed in the path of motion of said books to hinder the approach thereof to said stitching mechanism, timing mechanism for withdrawing said stop members from hindering position, means governed by said timing mechanism and adapted to start the operation of said stitching mechanism a predetermined time after the removal of said stop members, and means for determining the number and position of stitches to be inserted in said book.

39. In a device of the character described, the combination, with stitching mechanism, of a carrier for books traversing said mechanism, means for conveying books along said carrier, a continuously rotating shaft adjacent to said carrier, means carried by said shaft and arranged to govern the passage of books to and through said stitching mechanism, means for setting said stitching mechanism into operation operable when said shaft is in a predetermined phase of its revolution, and means for causing said stitching mechanism to operate during a predetermined angle of revolution of said shaft.

40. In a device of the character described, the combination, with stitching mechanism, of a carrier for books traversing said mechanism, means for conveying books along said carrier, a continuously rotating shaft adjacent to said carrier, means carried by said shaft and arranged to govern the passage of books to and through said stitching mechanism, means for setting said stitching mechanism into operation operable when said shaft is in a predetermined phase of its revolution, means for causing said stitching mechanism to operate during a predetermined angle of revolution of said shaft, and means for varying the rate of rotation of said shaft as regards the rate of operation of said stitching mechanism, whereby the number of stitches inserted in each book will be determined.

41. In a device of the character described, the combination, with stitching mechanism, of a support for books traversing said mechanism, means for conveying books along said support, a continuously rotating shaft adjacent to said carrier, means carried by said shaft and arranged to permit the passage of a single book past said stitching mechanism at each rotation thereof, a main shaft, means for connecting said stitching mechanism in operative relation to said main shaft during the rotation of said first shaft through a predetermined angle, a swinging arm pivoted about one of said shafts, a gear carried by said arm, a pinion secured to the other of said shafts and meshing with said gear, and driving connections between said gear and the shaft about which said arm is pivoted.

42. The combination, with stitching mechanism and a support for books traversing said stitching mechanism, said support having means for transporting books therealong, of a continuously rotating shaft adjacent to said support, a stop arranged to be interposed in the path of movement of said books, a cam carried by said shaft for operating said stop, a shiftable member arranged to be maintained in one of two positions, means operated by said shiftable member when in one of said positions for connecting said stitching mechanism in operative relation to said shaft, means operative upon the shifting of said shiftable member to the other of said positions for disconnecting said stitching mechanism from said shaft, and a rotatable member driven by said shaft and adapted to regulate the movement of said shiftable member from one position to the other, whereby said stitching mechanism will be operated in fixed phase relation to the movement of said stop.

43. The combination, with stitching mechanism, and a support for books traversing said stitching mechanism, said support having means for transporting books therealong, of a continuously rotating shaft, a stop arranged to be interposed in the path of movement of said books, a cam carried by said shaft for operating said stop, a shiftable member arranged to be maintained in one of two positions, means operated by said shiftable member in one of said positions for connecting said stitching mechanism in operative relation to said shaft, means operative upon the shifting of said shiftable member to the other of said positions for disconnecting said stitching mechanism from said shaft, and a rotatable member driven by said shaft and having passageways therethrough for said shiftable member, whereby said stitching mechanism can be thrown into operation only when said shaft stands in a fixed position, and will remain in operation until said shaft has turned through a predetermined angle.

44. The combination, with stitching mechanism and a support for books traversing said stitching mechanism, said support having means for transporting books therealong, of a continuously rotating shaft adjacent to said support, a stop arranged to be interposed in the path of movement of said books in advance of their arrival at said stitching mechanism, a cam carried by said shaft for operating said stop, a shiftable member arranged to be maintained in one of two positions, means operated by said shiftable member when in one of said positions for connecting said stitching mechanism in operative relation to said shaft, means operative upon the shifting of said shiftable member to the other of said positions for disconnecting said stitching mechanism from said shaft, a rotatable member driven by said shaft and adapted to regulate the movement of said shiftable member from one position to the other, means operative after the release of said stop member for shifting said shiftable member in a direction to cause the operation of said stitching mechanism, said cam being formed to return said stop to obstructing position prior to the return movement of said shiftable member.

45. In a device of the character described, the combination, with stitching mechanism and a carrier for books traversing said mechanism, said carrier having means for transporting said books therealong, of a continuously rotating shaft, a member rotatable with said shaft and having a peripheral flange, said flange being formed with a pair of spaced openings, a movable member having a finger extending into contact with said flange, and means connected with said last member and adapted to connect said stitching mechanism in operative relation to said shaft when said finger is in contact with one side of said flange and to prevent the operation of said stitcher by said shaft when said finger lies on the other side of said flange, whereby said stitcher can be thrown into operation only when said shaft is in a predetermined position, and will continue to operate during a predetermined angle of rotation of said shaft.

46. In a device of the character described, the combination, with stitching mechanism and a carrier for books traversing said mechanism, said carrier having means for transporting said books therealong, of a continuously rotating shaft, a circular member rotatable with said shaft and having a laterally extending peripheral flange, said flange being formed with a pair of radial openings, a movable member having a finger extending into contact with said flange, means connected with said last member and adapted to connect said stitching mechanism in operative relation to said shaft when said finger is moved inside said flange and to prevent the operation of said stitcher by said shaft when said finger lies without said flange, and means carried by said flange adjacent to one of said openings for preventing the admission of said finger through said opening whereby said stitcher can be thrown into operation only when said shaft is in a predetermined position, and will continue to operate until said finger passes again to the outside of said flange.

47. The combination, with stitching mechanism and a support for books traversing said stitching mechanism, said support having means for transporting books therealong, of a continuously rotating shaft adjacent to said support, a stop adapted to be interposed in the path of movement of said books in advance of their arrival at said stitching mechanism, a cam carried by said shaft for operating said stop, a rotatable member carried by said shaft and having internal and external faces, a movable member associated with said rotatable member and adapted to engage either the internal or external face thereof, means connected with said movable member for connecting said stitching mechanism in operative relation with said rotating shaft during such time as said movable member is in contact with the internal face of said rotating member and for maintaining said stitching mechanism out of such relation at other times, said rotatable member being formed with a passageway for said movable member from the external to the internal face thereof, means operative after the release of said stop member for shifting said movable member through said opening, means operative after a predetermined angular movement of said shaft for returning said movable member to its initial position, and means for returning said stop to obstructing position prior to the return movement of said movable member.

48. In a device of the character described, the combination, with stitching mechanism and a carrier for books traversing said mechanism and having means for transporting said books therealong, of a stop member adapted to be interposed into the path of movement of said books prior to their arrival at said stitching mechanism, timing mechanism adapted to permit the releasing movement of said stop at stated intervals, means operative a predetermined length of time after the releasing movement of said stop for putting said stitcher into operation, means operated by said timing mechanism for determining the number of stitches taken by such stitching mechanism, and means operatively connected with said stop and serving to prevent the releasing movement thereof excepting upon the presence of a book thereat at the time of the releasing movement of said timing mechanism.

49. In a device of the character described, the combination, with a book-receiving platform, of a pair of side members adjacent to said platform, a pair of guides carried by said side members and projecting upwardly therefrom, a second pair of guides of less width than said first guides, said second guides being carried by said side members in advance of said first guides and parallel thereto and forming therewith a downwardly inclined chute, a reciprocable follower insertible between said first guides and movable transversely of said chute, means for delivering books to said chute, and means for reciprocating said follower so as to force said books out of said chute, past the edges of said second guides and onto said platform.

In testimony whereof, I hereunto affix my signature in the presence of two witnesses.

DANIEL REISER.

Witnesses:
ALBERT H. BATES,
HAROLD E. SMITH.